May 13, 1952     E. W. GIEDD     2,596,769
PLOWSHARE
Filed May 6, 1946
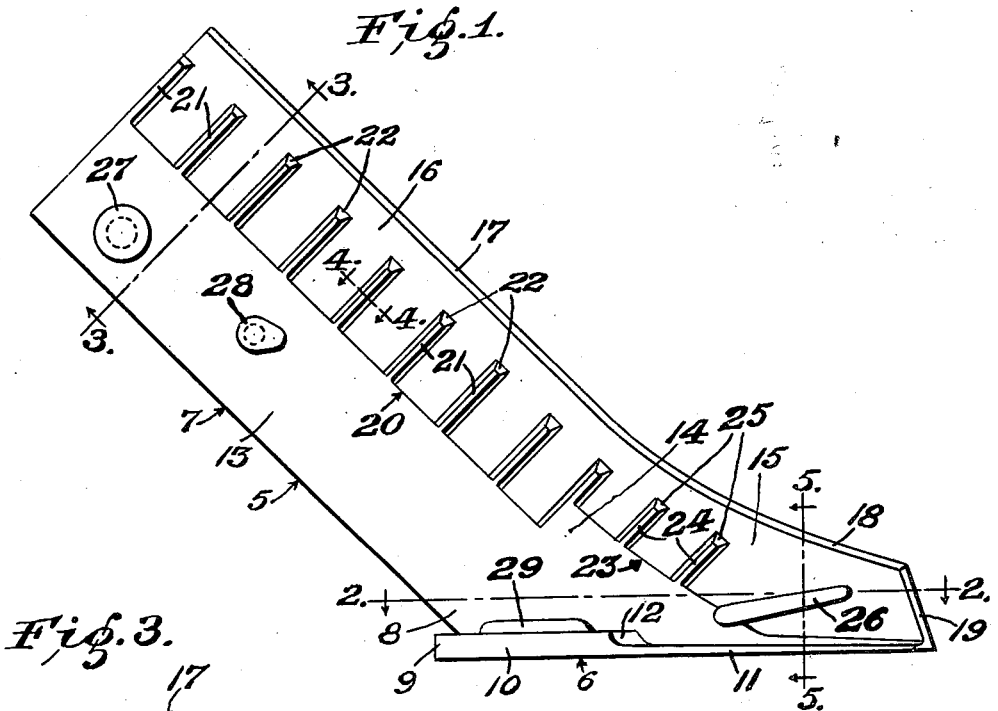
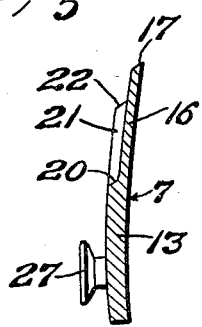
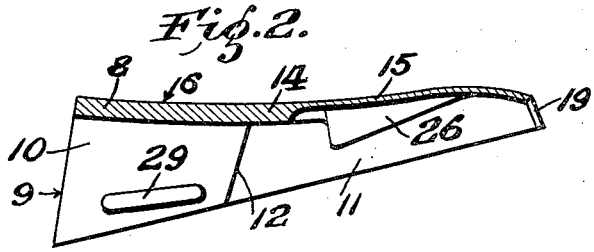
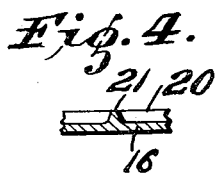
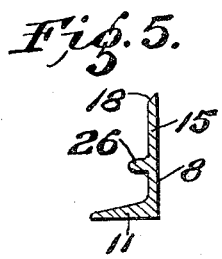
INVENTOR:
Emanuel W. Giedd,
BY A. M. Freeman
Attorney.

Patented May 13, 1952

2,596,769

UNITED STATES PATENT OFFICE 2,596,769

PLOWSHARE

Emanuel W. Giedd, Sioux Falls, S. Dak.

Application May 6, 1946, Serial No. 667,648

1 Claim. (Cl. 97—125)

This invention relates to plow shares or cultivator blades and the like and has for one of its objects to improve generally upon such articles so as to make them more practical, efficient and advantageous in use, as well as to prolong the working life and usefulness of such devices.

An especial object is to lighten and minimize the weight of the structure and at the same time provide ample stiffening and strengthening reinforcement to the same, with special structural provision enabling the device to be self-sharpening in use.

Other objects and advantages to be attained will hereinafter be more fully set forth in the following description.

A practical but non-limiting exemplification of the invention is set forth in the accompanying drawings, in which Figure 1 is a bottom plan view of a plow share illustrative of a practical adaptation of the invention;

Figure 2 is a longitudinal section of the nose portion of the plow share, taken on the line 2—2 of Figure 1;

Figure 3 is a cross section of the share portion of the device, taken on the line 3—3 of Figure 1;

Figure 4 is a fragmentary detail sectional view taken on or about the line 4—4 of Figure 1 and illustrative of a practical cross-sectional form of a reinforcing rib; and Figure 5 is a section in the line 5—5 of Figure 1.

Referring now to the drawings in detail, the numeral 5 designates, generally, a detachable and replaceable plow share or cultivator blade or tooth, as a whole. As shown, the article 5 comprises a landside portion 6 and a rearwardly extending side cutter and slicer portion 7. The landside portion 6 is generally vertically disposed and positioned in the normal or regular use of the device, and the portion 7 is inclined outwardly and rearwardly from the landside portion.

The landside portion 6 of the device, as shown, includes the side plate portion 8 and the integral laterally offset flange 9, of substantially triangular form in side elevation and whose rear portion is of substantial thickness, as at 10, and the forward portion thereof is reduced considerably in thickness, as at 11.

As shown, the portion 11 of the flange 9 is tapered from the adjoining side wall or plate portion 8 to its outer edge, which latter is thinned down to quite a sharp edge (see Figure 5). This relatively thin flange portion 11 merges at its inner longitudinal end portion with the substantially thicker rearward portion 10 of the flange in a transverse shoulder 12 which, preferably, is not an abrupt one but, rather, is slantingly beveled or rounded out, as a fillet (see Figure 1).

The rearward and under portion 13 of the rearwardly inclined part 7 of the device is of substantial thickness (see Figure 3) and so is the forward and rearward upstanding portion 14 of the plate part 8. So, too, the rearwardly inclined plate portion 7 of the device is preferably of a curved, slightly concavo-convex cross section with the bow at the side face of the device corresponding to that from which the angular flange 9 is projected (see Figures 2 and 3). However, the present invention is not limited strictly to the precise cross-sectional form shown but such form is susceptible of considerable modification and change within the purview of the invention as hereinafter claimed.

As far as the present invention is concerned, any suitable or approved means may be provided on the plow share for its original attachment, removable and replacement on a conventional plow or cultivator. As shown, it is provided with the usual button type, relatively large, lug 27, located near the rear end portion thereof, with a smaller lug 28 located slightly forwardly thereof on the inclined body portion thereof. The relatively thick portion 10 of the flange 9 of the share, as shown, is provided with an elongated, rib 29 which serves as a part of the attaching provision of the share.

The prime and more essential feature of the invention is the relative structural form and arrangement of the share so as to give desired lightness with needed strength and durability thereto and self-sharpening effect to the digging and cutting thereof, as will now be described.

As hereinbefore described, the flange 9, which is substantially triangular in plan form, has its rear portion 10 comparatively thick. However, its forward portion 11 is reduced considerably in thickness and it is also preferably tapered slightly to a rather sharp lateral edge. This portion 11 of reduced thickness, as before described, terminates at its rear longitudinal end in a nonabrupt shoulder 12 where it thus merges with the aforesaid thicker portion 10. The flange 9 is also preferably formed integrally with the adjacent portion 8 of the share.

As previously stated, the forward portion 14 of the plate portion 8 of the share is of substantial thickness like the rear portion 13 of the inclined part 7. In fact, the portions 13 and 14 are of one and the same thickness throughout the extent thereof. However, the forward portion 15 of the part 8 and the side edge portion 16 of the inclined upper part 7 are reduced considerably in thickness, these portions 15 and 16 having a common continuous cutting edge, the rearwardly extending edge portion 17 of which is somewhat elongated and inclinedly set, while the forward portion 18 of said cutting edge is curved forwardly and downwardly to a relatively short, inclined vertical cutting edge 19. These two continuing edge portions 15 and 16 and the forward end edge portion 19 are preferably beveled to produce a substantially fine cutting edge proper instead of being cut squarely crosswise so as to produce a decidedly blunt cutting edge as would occur if not beveled as just above described. This is here stressed because, according to the invention, the portions of reduced plate-like thickness 15 and 16 are especially formed in one and the same thickness throughout. This is to produce the self-sharpening feature of the invention and at the same time maintain a constantly uniform thickness of said reduced portions 15 and 16 as the cutting edge portions 17, 18 and 19 wear away due to their continuous working contact with the ground which is being plowed or cultivated, and also when the cutting edges are sharpened by physical sharpening means in some cases.

The portion of reduced thickness 16 of the share terminates some distance inwardly from the elongated and inclined cutting edge portion 17 at an elongated shoulder 20 extending longitudinally of the inclined portion 13 of the share and preferably parallel with said cutting edge portion 17. This shoulder, like the aforesaid base shoulder 12, is preferably non-abrupt.

Extending in parallel relation to each other, and at right angles to the shoulder 20, is a multiplicity of ribs 21 formed on the reduced thickness portion 16 of the share. These ribs 21 are preferably tapered in cross section (see Figure 4). That is to say, they are wider at their bottom portions which merge flaringly and roundedly with the adjacent face portions of the portion 16 of the share. The ribs thus effectively reinforce and stiffen the relatively thin plate-like part of the share. So, too, the several ribs 21 terminate at their outer ends some distance short of the cutting edge 17 so as not to interfere with the cutting action of said edge 17 in use of the share. Also, the outer ends of said ribs 21 are preferably beveled off, as at 22 (see Figures 1 and 3).

The outer ends 22 of the ribs 21 are made to terminate normally a substantial distance short of the cutting edge 17 not only so as not to interfere with the cutting action of said edge 17 but to also permit considerable wearing away of the edge in use without appreciable interference by the ends of the ribs.

It is here noted that, after the edge portion 17 has worn away an appreciable amount in use, the beveled end portions 22 may be ground off by suitable physical means so as to shorten the ribs and again provide a substantial space between the ends of the ribs and said cutting edge 17, this provision prolonging the useful working life of the plow share.

In the forward region of the share, the thicker plate portion 14 is considerably wider than the thickened portion 13 and the portion 15 of reduced thickness is much narrower than the relatively thin portion 16. A shoulder 23, similar to the aforesaid shoulder 20, is formed at the rear and forward edge of the thickened portion 14, and from this shoulder 23 a plurality of shorter ribs 24, similar to the aforesaid ribs 21, are extended at right angles and terminate substantially the same distance short of the cutting edge 18 of the thinner plate portion 15 as do the ribs 21 in relation to the cutting edge portion 17. These ribs 24 have the same reinforcing effect as the aforesaid ribs 21 and the end portions 25, which are similar to and positioned in substantially the same relation as the corresponding ends 22 of said ribs 21 are readily ground off when it becomes necessary as in the case of said ribs 21.

The forward shoulder 23 joins and merges with a rearwardly extending reinforcing rib 26 which is of somewhat triangular plan form and thus provided to reinforce the extreme nose part of the digger edge 19 of the share so that said edge 19 may wear considerably away yet still be cuttingly effective without any interference by the rib 26, the forward end portion of which latter like the corresponding end of the aforesaid ribs 21 and 24, is readily ground away by applied physical means to restore ample clearance space between said rib 26 end and the digger edge 19.

While the illustrated construction and arrangement is a practical exemplification of the invention the same is not thereby limited to the precise form shown but admits of considerable modification and change within the spirit and scope of the appended claim.

What is claimed is:

A plow share composed of a body portion and a shoe portion, said body portion having a cutting portion of equal but reduced thickness throughout provided with a self-sharpening cutting edge, and a series of spaced reinforcing ribs extending at substantially right angles to the cutting edge but terminating short thereof and at their inner ends abutting the shoulder resultant from the reduced cutting portion, the sides of the ribs being flared outwardly and the terminal edges of the ends being bevelled, the cutting portion adjacent the shoe portion being of reduced width, ribs on said reduced portion of less length than first mentioned ribs and a reinforcing rib arranged substantially parallel to the base of the shoe which extends outwardly from the lower end of the shoulder formed at the reduced cutting portion of the plow share.

EMANUEL W. GIEDD.

REFERENCES CITED

The following references are of record in the file of this patent:

UNITED STATES PATENTS

| Number | Name | Date |
| --- | --- | --- |
| 562,244 | Rosencranz | June 16, 1896 |
| 592,858 | Anderson | Nov. 2, 1897 |
| 860,308 | Lindgren | July 16, 1907 |
| 1,447,883 | Peterson | Mar. 6, 1923 |
| 2,059,923 | Whitaker | Nov. 3, 1936 |

FOREIGN PATENTS

| Number | Country | Date |
| --- | --- | --- |
| 656,069 | Germany | Jan. 28, 1938 |